(12) United States Patent
Johnson et al.

(10) Patent No.: US 7,282,652 B1
(45) Date of Patent: Oct. 16, 2007

(54) PORTABLE WEIGHING SYSTEM

(76) Inventors: Michael Karl Johnson, 301 W. 21st St., Hays, KS (US) 67601; Lee Allen Reed, 2302 Castle Rock Rd., Hays, KS (US) 67752

( * ) Notice: Subject to any disclaimer, the term of this patent is extended or adjusted under 35 U.S.C. 154(b) by 0 days.

(21) Appl. No.: 11/442,081

(22) Filed: May 27, 2006

Related U.S. Application Data

(60) Provisional application No. 60/685,352, filed on May 27, 2005.

(51) Int. Cl.
*G01G 21/28* (2006.01)
(52) U.S. Cl. ........................................ 177/126; 177/144
(58) Field of Classification Search ................ 177/126, 177/144
See application file for complete search history.

(56) References Cited

U.S. PATENT DOCUMENTS

| | | | | |
|---|---|---|---|---|
| 3,338,323 A | * | 8/1967 | Swersey ..................... | 177/144 |
| 3,961,675 A | * | 6/1976 | Siegel ......................... | 177/126 |
| 4,281,730 A | * | 8/1981 | Swersey et al. ............. | 177/144 |
| 4,926,951 A | * | 5/1990 | Carruth et al. .............. | 177/144 |
| 5,172,781 A | * | 12/1992 | Hlavinka et al. ........... | 177/144 |
| 6,765,154 B2 | * | 7/2004 | Sternberg .................... | 177/126 |

FOREIGN PATENT DOCUMENTS

JP         02-203219 A   *  8/1990  .................. 177/253

* cited by examiner

*Primary Examiner*—Randy W Gibson
(74) *Attorney, Agent, or Firm*—Robert O. Blinn

(57) ABSTRACT

A hospital bed weighing system includes four carriage assemblies and a frame assembly. Each of the four carriage assemblies includes a wheel support member for receiving and supporting one of the four wheels of a typical hospital bed. Two caster wheels are mounted at opposite ends of each carriage assembly by a load cell. Inputs from the load cells is analyzed and displayed by a weight display unit which may be calibrated to weigh a bed occupant by subtracting out the weight of the supported bed. The four carriage assemblies are positioned relative to each other by an adjustable frame assembly which is designed to not transfer substantial loads between the carriage assemblies. Since the carriage assemblies are supported by caster wheels, a bed supported by the weighing system may be moved about substantially as if it were rolled upon its own wheels.

13 Claims, 6 Drawing Sheets

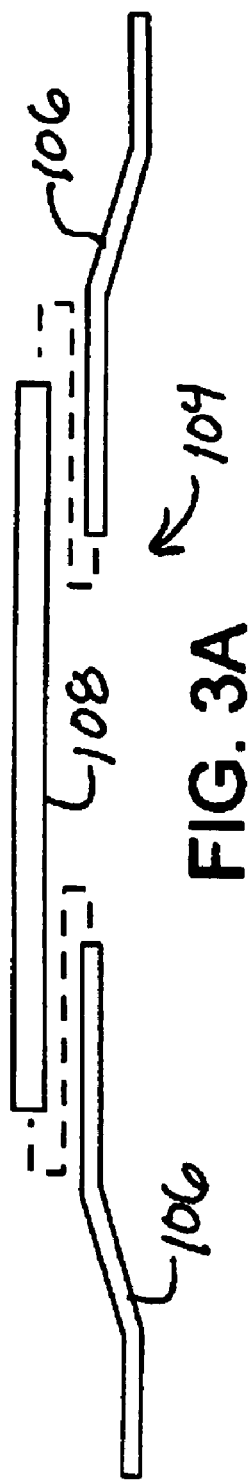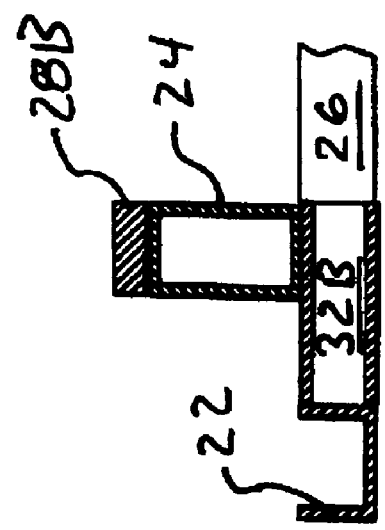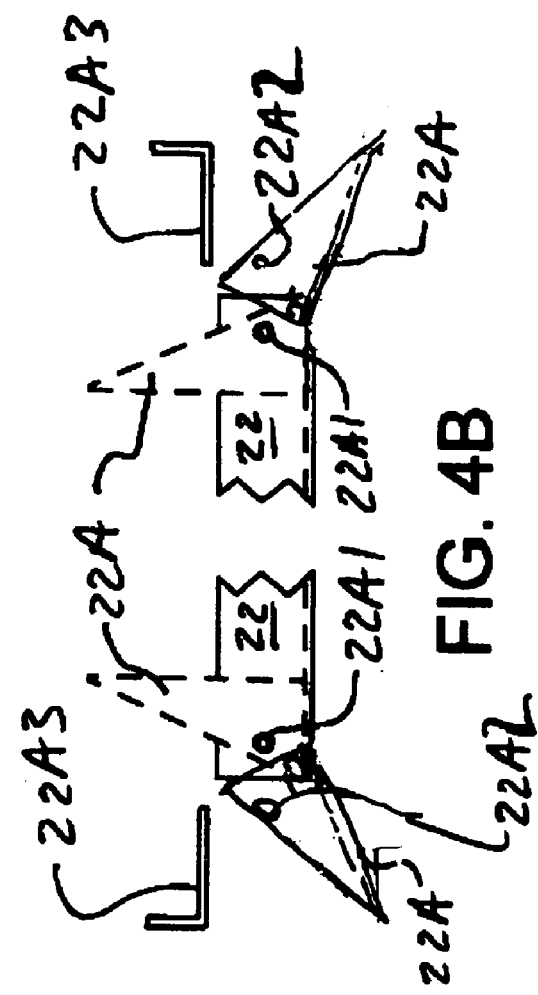
FIG. 3A
FIG. 4A
FIG. 4B

US 7,282,652 B1

PORTABLE WEIGHING SYSTEM

CROSS REFERENCES TO RELATED APPLICATIONS

This application claims the benefit of U.S. Provisional Patent Application No. 60/685,352 filed May 27, 2005.

FIELD OF THE INVENTION

This invention relates to an apparatus for weighing a patient when the patient is supported by a hospital bed.

BACKGROUND OF THE INVENTION

The prior art teaches hospital beds having integrated load transducer type weighing systems for providing patient weight data. Separate, stand alone hospital bed weighing devices for placement under each supporting wheel have also been proposed for use with hospital beds which lack an integrated weighing system. However, present stand alone bed weighing devices, once in place, prevent movement of the hospital bed. For various reason, there may exist a need, even an urgent need to move a hospital bed. What is needed is a stand alone weighing system which supports a bed and still allows rolling movement of the supported bed.

BRIEF DESCRIPTION OF THE INVENTION

In an embodiment of the present invention the aforementioned need is addressed by a portable weighing system including four carriage assemblies having load cells and a frame assembly. Each of the four carriage assemblies includes a wheel support member for receiving and supporting one of the four wheels of a typical hospital bed. Two caster wheels are mounted at opposite ends of each carriage assembly by load cells having load transducers for measuring the load supported by each caster wheel. The load cells provide inputs to a weight display unit which can be calibrated to cancel out the weight of the bed to facilitate measuring the weight of a patient occupying the bed. The four carriage assemblies are positioned relative to each other by the frame assembly. The frame assembly may be adjusted so that the positions of the four wheel support members corresponds to the relative positions of the four wheels supporting a hospital bed. The frame assembly is designed to position the carriage assemblies while not transferring substantial loads between them. Accordingly, the members of the frame assembly are connected to each other by design in a relatively loose and adjustable fashion. Since the carriage assemblies are supported by caster wheels, a bed supported by the weighing apparatus of the present invention may be moved about substantially as if it were rolled upon its own wheels. It is preferable that at least some of the wheels of the carriage assemblies have provisions for locking the wheel so that movement of the bed may be prevented.

BRIEF DESCRIPTION OF THE DRAWINGS

FIG. 3A is a side view of a three piece center strut assembly for the frame assembly of the weighing apparatus.

FIG. 4A is a cross section view taken from plane A-A of FIG. 4.

FIG. 4B is a detail view of a ramp assemblies attached to a wheel support member.

DETAILED DESCRIPTION

Figure 1:
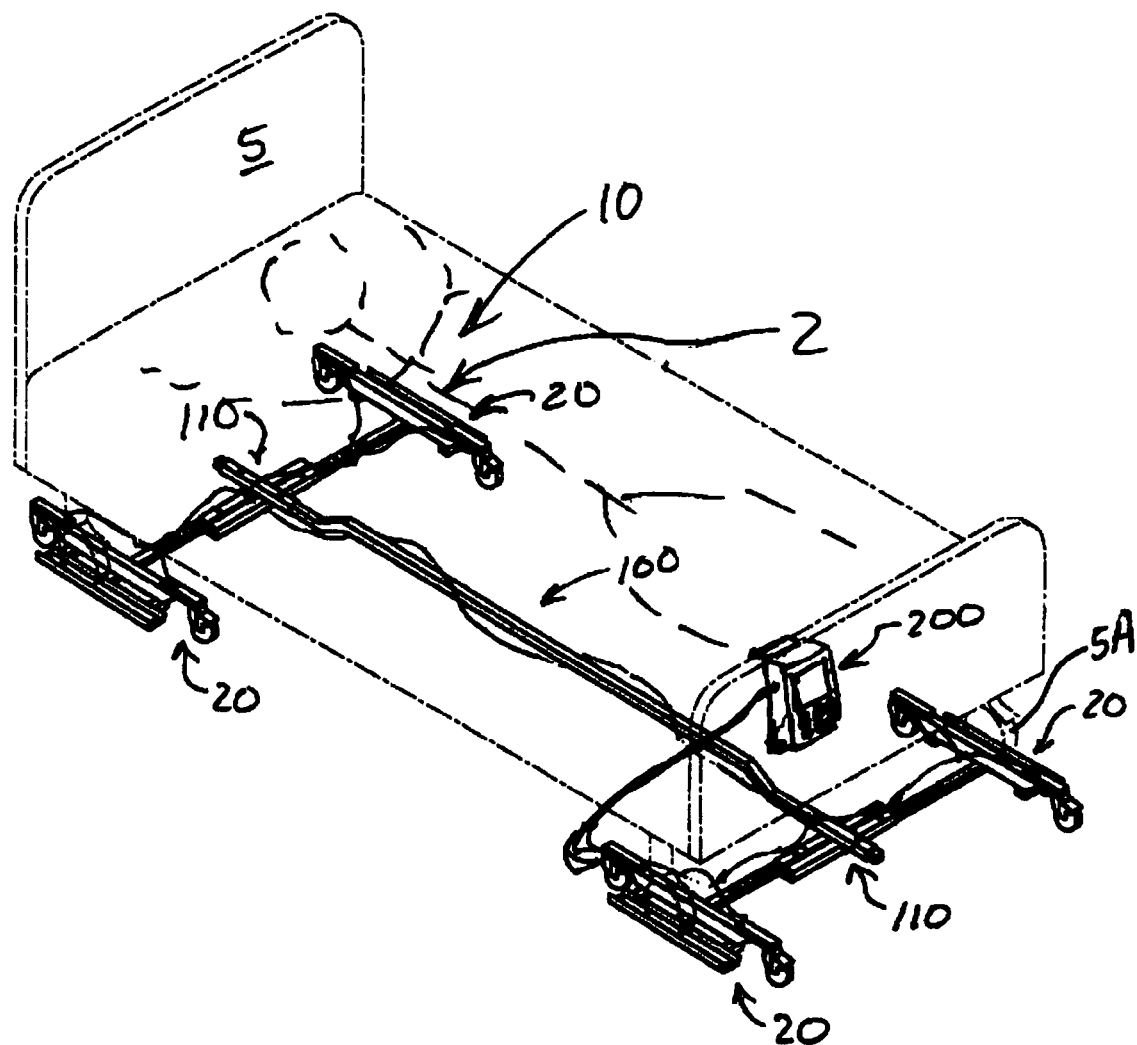
FIG. 1 is a perspective view of an embodiment of the weighing apparatus of the present invention supporting a hospital bed.
Figure 2:
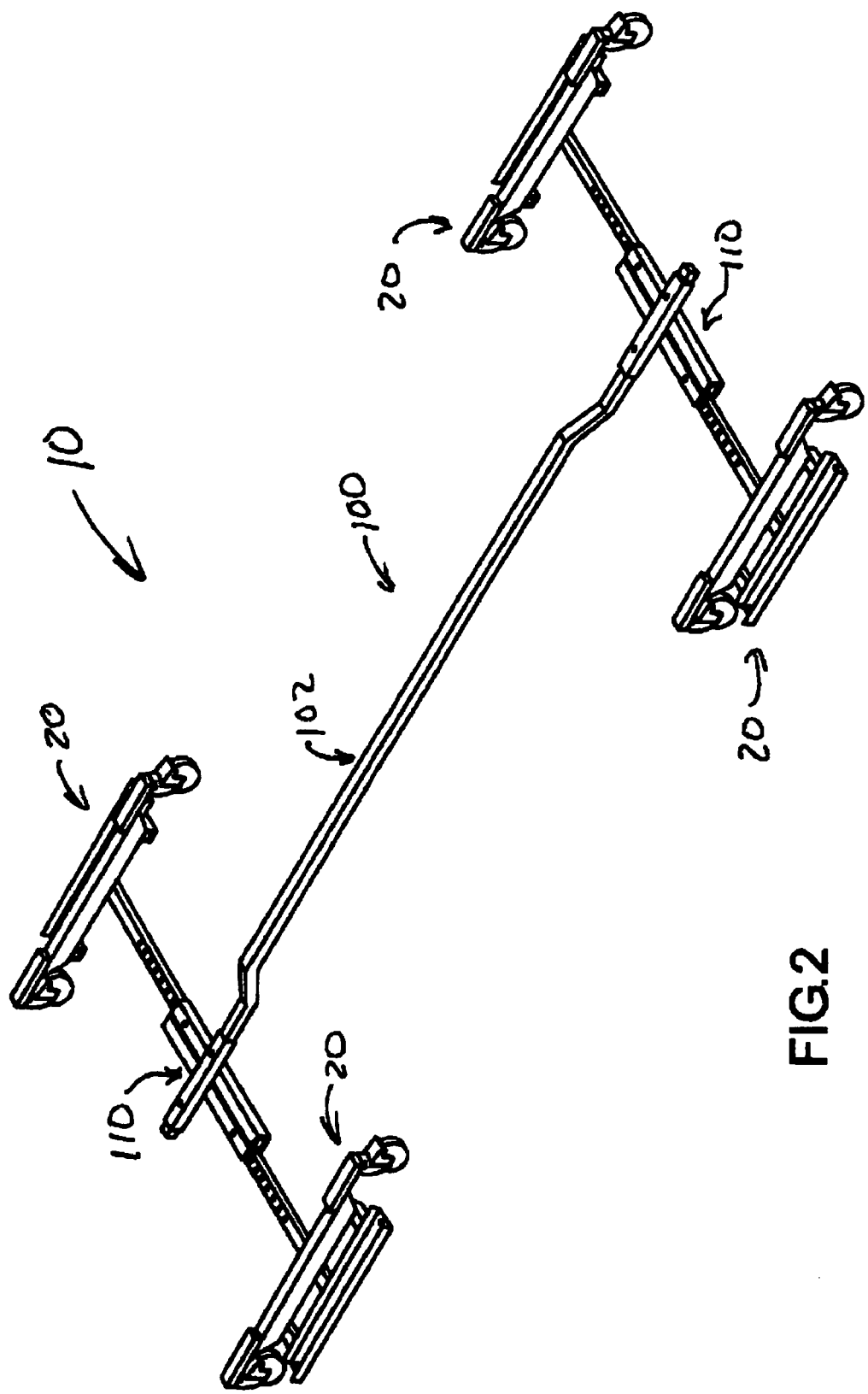
FIG. 2 is a perspective view of an embodiment of the weighing apparatus of the present invention.

Referring to the drawings, FIG. 1 illustrate the portable weighing system 10 supporting a wheel supported hospital bed 5. Generally, portable weighing system 10 includes carriage assemblies 20 and a frame assembly 100. Frame assembly 100 further includes two opposite and end assemblies 110 and a longitudinal brace 102. Each carriage assembly 20 includes two load cells which are electrically connected to weight display unit 200 which may, for example, be mounted on the base board of bed 5. The collection, analysis and display of such load cell output data are steps that are well known in the art. In the alternative, the load cell signals may be collected by a signal conditioning device which converts load cell data to standard formats for use by other systems such as may display weight values for hospital staff at bedside or at a nursing station. Throughout this specification, components and assemblies which are identical will not be separately described or given separate reference numbers in the figures. The skilled reader should understand, for example, that carriage assemblies 20 are identical and include identical elements. End assemblies 110 are also identical and include identical elements. A useful feature of this invention is that standard parts and assemblies may be combined to fashion a weighing system 10.

Figure 4:
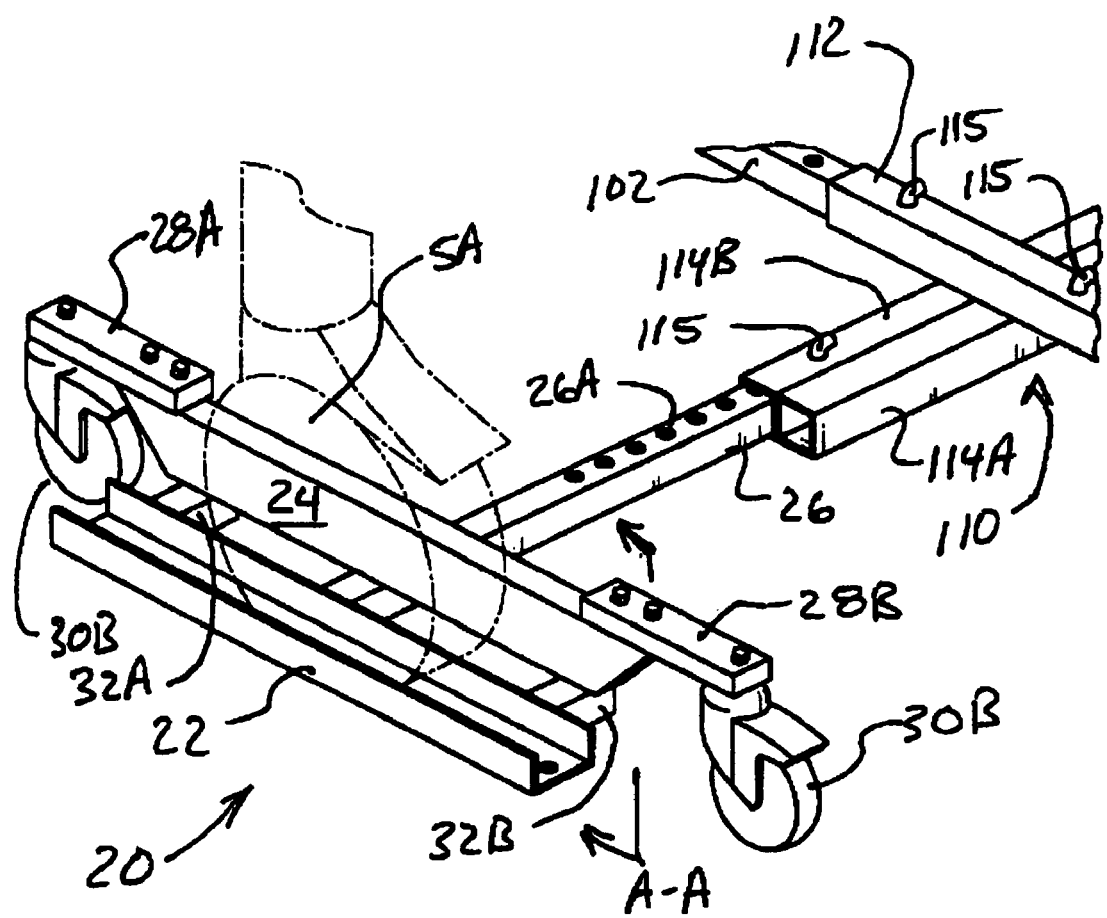
FIG. 4 is a magnified perspective view of a carriage assembly.

As can be seen in FIG. 1, hospital bed 5 is supported by wheels 5A. Wheels 5A are each supported by a carriage assembly 20. Carriage assembly 20 is shown in greater detail in FIG. 4. As can be seen in FIG. 4 carriage assembly 20 includes a wheel support member 22, a longitudinal support member 24, a transverse strut 26, load cells 28A and 28B, caster wheels 30A and 30B and two support braces 32A and 32B. Wheel support member 22 is preferably fashioned from a channel which provides a track for receiving the wheel of a hospital bed as shown in FIG. 1. In this embodiment wheel support member 22 is shown as an elongated channel. However, any suitable member capable of receiving and supporting a hospital bed wheel may be used as a wheel support member.

FIG. 4B illustrates an optional wheel ramp 22A which may be mounted to one or both ends of wheel support member 22 to provide a ramp for receiving wheels 5A of hospital bed 5. Optional wheel ramp 22A rotates between a first retracted position shown with phantom lines and a second extended position shown with solid lines in FIG. 4B. Corresponding pin holes 22A1 and 22A2 in wheel support member 22 and wheel ramp 22A receive pin 22A3 to lock wheel ramp 22A in the first retracted position. When in the first retracted position, wheel ramp 22A blocks wheel 5A from rolling off of wheel support member 22. When in the second extended position, wheel ramp 22A receives wheel 5A for rolling on to wheel support member 22.

Load cells 28A and 28B are mounted at opposite ends of longitudinal support member 24. As can be seen in FIG. 4, load cells 28A and 28B communicate between caster wheels 30A and 30B and longitudinal support member 24 and thus provide the only load path between caster wheels 30A and 30B and longitudinal support member 24.

As shown in FIG. 4A, wheel support member 22 and longitudinal support member 24 are fixed together at opposite ends by support braces 32A and 32B and at the center by transverse strut 26. Transverse strut 26 also provides a means for connecting carriage assembly 20 to frame assembly 100. Transverse strut 26 is preferably fashioned from tubular steel and extends away from wheel support member 22. As noted above, wheel support member 22 is preferably fashioned from a steel channel. Longitudinal support member 24, and support braces 32A and 32B are preferably fashioned from tubular steel. The various structural elements described above may be welded or fastened together as shown.

Figure 3:
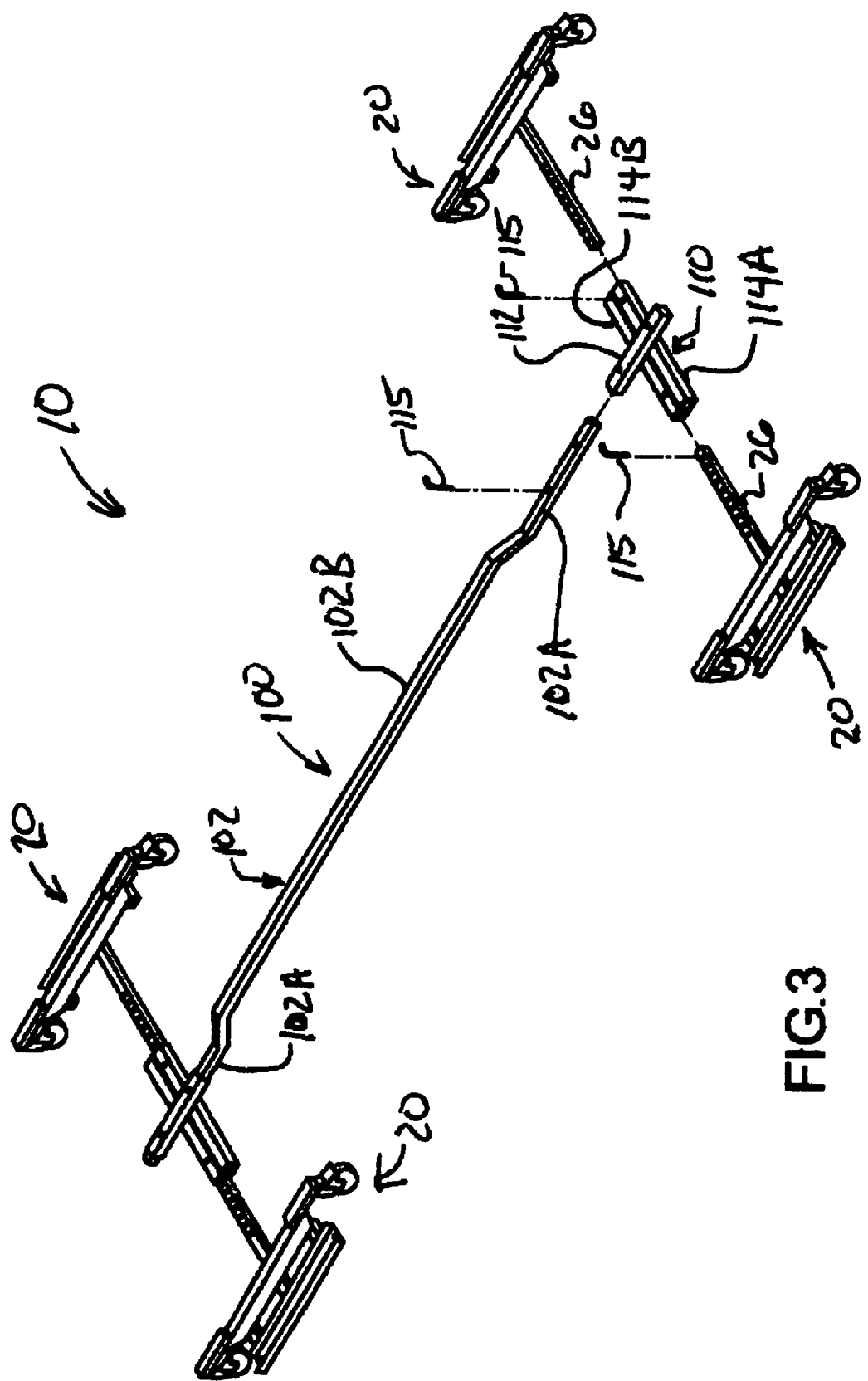
FIG. 3 is a perspective view of an embodiment of the weighing apparatus of the present invention with one end of the apparatus partially disassembled.

The purpose of frame assembly 100 is to locate or position wheel support members 22 of carriage assemblies 20 in positions that correspond to the positions of wheels 5A of hospital bed 5. The assembly of frame assembly 100 and carriage assemblies 20 can be best understood with reference to FIG. 3. Frame assembly 100 includes a center strut 102 and two opposite and preferably identical end assemblies 110. Center strut 102 includes a central raised portion 102B for allowing passage of the legs of standard hospital carts and tables and two end portions 102A for engaging end assemblies 110. FIG. 3 shows center strut 102 as a single piece element. However, center strut 102 may also be fashioned from interconnecting tubular steel members as shown in FIG. 3A. In FIG. 3A, center strut 102 is replaced by a three piece center strut assembly 104 having two end pieces 104 and a center portion 108. Each end assembly 110 includes one longitudinal member 112 for receiving one end of center strut 102 and two transverse members 114A and 114B for receiving the respective ends of transverse struts 26 of opposite carriage assemblies 20. Each transverse strut 26 includes a plurality of pin holes 26A while each of transverse members 114A and 114B includes a single corresponding set of pin holes for receiving a locking pin 115. The skilled reader will note that the moment arm of transverse strut 26 of each carriage assembly 20 is relatively long so that the moment associated with the offset of wheel support member 22 from longitudinal member 24 of carriage assembly 20 results in a relatively small reactive force at the joint where transverse strut 26 joins a transverse member 114A or 114B. Transverse struts 26 of carriage assemblies 20 may be adjustably mounted to each end assembly 110 to accommodate hospital beds of varying widths. The pin joints made by inserting locking pins 115 into corresponding holes as shown in FIG. 3 are preferably relatively loose but secure from falling apart during use. Frame assembly 100 preferably assembles as a loose fitting arrangement which generally does not transfer significant loads between carriage assemblies 20. Accordingly, opposite carriages 20 on either side of an end assembly 110 may be capable of rotating about a transverse axis to a significant degree. This allows each of the four caster wheels 30B associated with each end assembly 110 to make firm contact. This loose fitting arrangement enables the same independent, even contact for caster wheels 30B associated with the opposite end assembly 110.

Geometrically, three points make a plane. This basic three point principle in the overall design of frame assembly 100 and carriage assemblies 20 and the way in which frame assembly 100 and carriage assemblies 20 are joined together. To insure that caster wheels 30A and 30B in each carriage assembly 20 and thus all four carriage assemblies 20 make uniform contact with the floor, the structure of each carriage assembly 20 with respect to caster wheels 30A and 30B creates a three point contact. Each caster wheel 30A and 30B provides two contact points and the third contact point is provide by the relatively loose joint between transverse strut 26 and whichever of transverse members 114A or 114B receives transverse strut 26. Accordingly, scale frame 12 is relatively flexible with each caster wheel 30A or 30B and each carriage assembly 20 free to move independently. This is possible because the frame of hospital bed 5 is relatively strong and rigid. The frame of hospital bed 5 is strong and rigid for supporting a patient, whereas, scale frame 12 is generally flexible and thus particularly adapted for the purpose of weighing a patient supported by hospital bed 5.

Figure 4C:
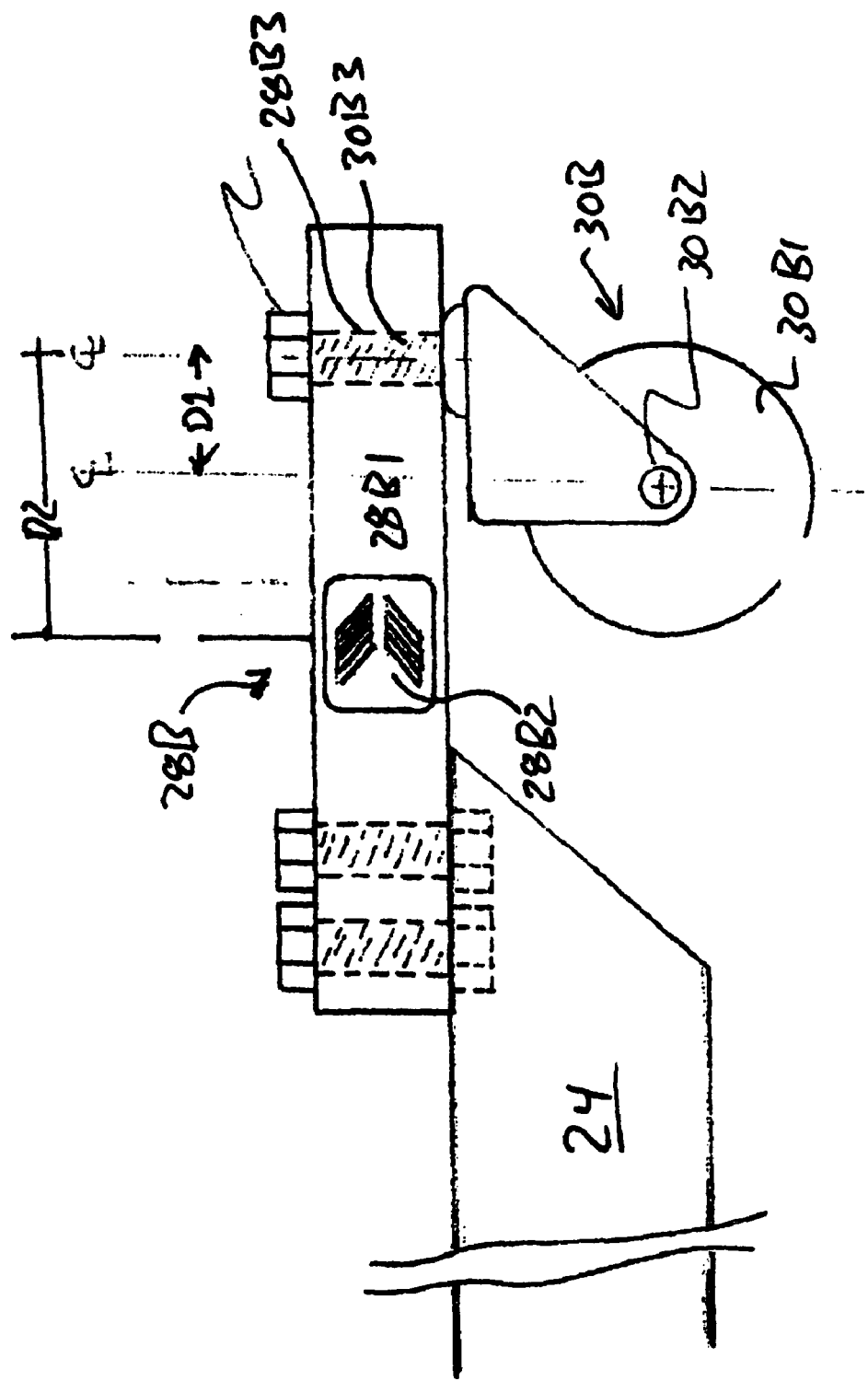
FIG. 4C is a detail view of one end of a carriage assembly showing details of a shear load cell and a caster wheel.

Load cells 28A and 28B of carriage assembly 20 are preferably identical and are preferably shear beam load cells. Shear beam load cells include strain gauge elements for measuring the magnitude of shear stress resulting from the applied load. The advantage of a shear beam load cell as opposed to a cantilever beam load cell is that a shear beam load cell will register generally the same amount of shear regardless of the position of a caster wheel 30A or 30B. Load cells 28A and 28B as well as caster wheels 30A and 30B are preferably symmetrical and identical. FIG. 4C illustrates shear load cell 28B and caster wheel 30B. Shear load cell 28B further includes a load cell member 28B1 and a strain gauge 28B2 for measuring shear stress in load cell member 28B1. Caster wheel 30B includes a wheel 30B1, an axle 30B2 and caster stem 30B3. Caster stem 30B3 is received by a corresponding caster stem bore 28B3 in the distal end of load cell member 28B1. Since shear load cells 28A and 28B and caster wheels 30A and 30B, FIG. 4 should be understood as illustrating similar structures associated with shear load cell 28A and caster wheel 30A mounted to the opposite end of longitudinal member 24.

By using shear beam load cells, errors due offset loading problems or eccentric loading are minimized. Those familiar with shear and moment diagrams will appreciate that bending stresses may vary according to the applied bending moment whereas a shear stress will remain relatively constant past the point where a force is applied. In order to exploit shear beam load cells for this purpose, the distance D2 between caster stem 30B3 and strain gauge 28B2 should be greater than the horizontal distance D1 between caster axle 30B2 and caster stem 30B3. It is also important that the hospital bed wheel 5A as shown in FIG. 4 be disposed generally between opposite shear load cells 28A and 28B.

Data from load cells 28A and 28B of each carriage assembly 20 are communicated to a weight display unit 200. In FIG. 1, weight display unit 200 is shown mounted to hospital bed 5. Weight display unit 200 may be of a conventional type well known in the art and may placed or mounted in any convenient location. Weight display unit 200 is adapted to receive inputs from the eight load cells 28A and 28B of the four carriage assemblies 20 and add those inputs to determine a weight value which is displayed by weight display unit 200. As is well known in the art, the purpose of a hospital bed weighing system is not to find the weight of a hospital bed. The purpose of such a system is to monitor the weight of a patient, indicated as a patient 2 in FIG. 1, occupying a bed. Accordingly, weight display unit 200 preferably includes a calibration function which allows an operator to tare out the weight of the bed in order to display the weight of the patient.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A weighing system for weighing a patient supported by a hospital bed, comprising:
    (a) a frame assembly having opposite ends and at least one transverse member mounted to each of said opposite ends of said frame assembly, each of said transverse members presenting two opposite outboard ends spaced away from the center of the frame assembly,
    (b) at least four carriage assemblies, each one of said four carriage assemblies including a longitudinal support member for supporting one of four wheels supporting a hospital bed, a transverse strut extending generally normally from said longitudinal support member, said transverse strut adapted for mounting to one of said outboard ends of one of said transverse members of said frame assembly, a pair of shear load cells each having a first end and a second opposite end and at least one strain gauge disposed between said first end and said second end for measuring shear stress in said load cell, each shear load cell mounted at its first end to respective one of the opposite ends of said longitudinal support member, caster wheel assemblies each including a caster stem rotatably mounted to the second end of each one of said shear load cells and a caster axle spaced away from said caster wheel stem, each said shear load cell and said caster wheel arranged such that said the horizontal distance between said strain gauge of said shear load cell and said caster wheel stem is greater than the horizontal distance between said caster axle and said caster stem, said shear load cells and said longitudinal support member of each carriage assembly arranged such that said wheel of said hospital bed may be supported at a location which is generally between said strain gauges of said shear load cells,
    (c) a weight display unit in communication with each of said strain gauges of said shear load cells for processing signals from said shear load cells and determining the total weight supported by said shear load cells, the weight display unit at least having a means for storing the measured weight of said hospital bed when not occupied by a patient and subtracting that measured the non occupied weight from the measured weight of said hospital bed when occupied by a patient whereby the weight of the patient may be displayed by the weight display unit.

2. The weighing system of claim 1 wherein said transverse strut of each of said carriage assemblies is adapted for mounting to one of said outboard ends of one of said transverse members of said frame assembly such that the joining of said transverse strut and one of said outboard ends of one of said transverse members allows sufficient axial pivoting of said carriage assembly with respect to said transverse members of said frame to substantially prevent transfer of a turning moment between said carriage and said frame assembly.

3. The weighing system of claim 1 further comprising:
a wheel support member mounted to each of said longitudinal support members of each of said carriage assemblies, each said wheel support member having a channel cross section for receiving a wheel of a hospital bed.

4. The weighing system of claim 1 further comprising:
a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel.

5. The weighing system of claim 1 further comprising:
a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel, each of said ramps pivotably mounted to said wheel support member for pivoting between an extended position for receiving a hospital bed wheel and a retracted position.

6. A hospital bed weighing system for weighing a patient supported by a hospital bed, comprising:
    (a) a frame assembly having opposite ends and at least one transverse member mounted to each of said opposite ends of said frame assembly, each of said transverse members presenting two opposite outboard ends spaced away from the center of the frame assembly,
    (b) at least four carriage assemblies, each one of said four carriage assemblies including a longitudinal support member for supporting one of four wheels of a hospital bed, a pair of load cells each having a first end and a second opposite end and at least one strain gauge disposed between said first end and said second end for measuring stress in said load cell, each load cell mounted at its first end to respective one of the opposite ends of said longitudinal support member and a wheel mounted to the opposite second end of each one of said load cells, a transverse strut extending generally normally from said longitudinal support member, said transverse strut of each of said carriage assemblies adapted for mounting to one of said outboard ends of one of said transverse members of said frame assembly such that the joining of said transverse strut and one of said outboard ends of one of said transverse members of said frame assembly allows sufficient axial pivoting of said carriage assembly with respect to said transverse members of said frame assembly to substantially prevent transfer of a turning moment between said carriage and said frame assembly,
    (c) a weight display unit in communication with each of said strain gauges of said shear load cells for processing signals from said shear load cells and determining the total weight supported by said shear load cells, the weight display unit at least having a means for storing the measured weight of said hospital bed when not occupied by a patient and subtracting that measured the non occupied weight from the measured weight of said hospital bed when occupied by a patient whereby the weight of the patient may be displayed by the weight display unit.

7. The weighing system of claim 6 further comprising:
a wheel support member mounted to each of said longitudinal support members of each of said carriage assemblies, each said wheel support member having a channel cross section for receiving a wheel of a hospital bed.

8. The weighing system of claim 6 further comprising:
a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel.

9. The weighing system of claim 6 further comprising:

a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel, each of said ramps pivotably mounted to said wheel support member for pivoting between an extended position for receiving a hospital bed wheel and a retracted position.

10. A weighing system for weighing a patient supported by a hospital bed, comprising:

(a) a frame assembly including a center strut having opposite ends and at least one transverse member mounted to each of said opposite ends of said center strut, each of said transverse members presenting two opposite outboard ends spaced away from said center strut, (b) at least four carriage assemblies, each one of said four carriage assemblies including:

a longitudinal support member for supporting one of four wheels supporting a hospital bed, a transverse strut extending generally normally from said longitudinal support member, said transverse strut adapted for mounting to one of said outboard ends of one of said transverse members of said frame assembly such that the joining of said transverse strut and one of said outboard ends of one of said transverse members allows sufficient axial pivoting of said carriage assembly with respect to said transverse members of said frame to substantially prevent transfer of a turning moment between said carriage and said frame assembly, a pair of shear load cells each having a first end and a second opposite end and at least one strain gauge disposed between said first end and said second end for measuring shear stress in said load cell, each shear load cell mounted at its first end to respective one of the opposite ends of said longitudinal support member, caster wheel assemblies each including a caster stem rotatably mounted to the second end of each one of said shear load cells and a caster axle spaced away from said caster wheel stem, each said shear load cell and said caster wheel arranged such that said the horizontal distance between said strain gauge of said shear load cell and said caster wheel stem is greater than the horizontal distance between said caster axle and said caster stem, said shear load cells and said longitudinal support member of each carriage assembly arranged such that said wheel of said hospital bed is disposed between said strain gauges of said shear load cells, (c) a weight display unit in communication with each of said strain gauges of said shear load cells for processing signals from said shear load cells and determining the total weight supported by said shear load cells, the weight display unit at least having a means for storing the measured weight of said hospital bed when not occupied by a patient and subtracting that measured the non occupied weight from the measured weight of said hospital bed when occupied by a patient whereby the weight of the patient may be displayed by the weight display unit.

11. The weighing system of claim 10 further comprising:

a wheel support member mounted to each of said longitudinal support members of each of said carriage assemblies, each said wheel support member having a channel cross section for receiving a wheel of a hospital bed.

12. The weighing system of claim 10 further comprising:

a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel.

13. The weighing system of claim 10 further comprising:

a wheel support member mounted to each of said longitudinal support members of each of said carriage assemblies, each said wheel support member having a channel cross section for receiving a wheel of a hospital bed, and a wheel ramp mounted to at least one end of each for receiving a hospital bed wheel, each of said ramps pivotably mounted to said wheel support member for pivoting between an extended position for receiving a hospital bed wheel and a retracted position.

* * * * *